United States Patent [19]
Bostelman

[11] Patent Number: 5,846,038
[45] Date of Patent: Dec. 8, 1998

[54] VOID FILLER WITH MULTIPLE INTERSECTING CELLS

[75] Inventor: Arthur L. Bostelman, Oak Brook, Ill.

[73] Assignee: Corrugated Container Corp., Elmhurst, Ill.

[21] Appl. No.: 701,176

[22] Filed: Aug. 21, 1996

[51] Int. Cl.$^6$ ............................................. B60P 7/135
[52] U.S. Cl. ................................... 410/154; 410/155
[58] Field of Search .................... 410/121, 122, 410/154, 155; 206/593, 814; 229/117.01, 117.03; 248/351; 428/121, 12, 184, 118

[56] References Cited

U.S. PATENT DOCUMENTS

| | | |
|---|---|---|
| 2,957,668 | 10/1960 | Norquist et al. . |
| 3,079,876 | 3/1963 | Doane . |
| 3,079,877 | 3/1963 | Doane . |
| 3,405,659 | 10/1968 | Hees . |
| 3,421,451 | 1/1969 | Brucks .................................. 410/154 |
| 3,424,108 | 1/1969 | Vargen .................................. 410/154 |
| 3,464,367 | 9/1969 | Latter .................................... 410/154 |
| 3,534,691 | 10/1970 | Carlomagno, Jr. ..................... 410/155 |
| 3,593,671 | 7/1971 | Bramlett ................................ 410/154 |
| 3,854,426 | 12/1974 | Kinnune ................................ 410/154 |
| 4,109,587 | 8/1978 | Jansen, Jr. ............................. 410/154 |
| 4,363,579 | 12/1982 | Rogers .................................. 410/154 |
| 4,372,717 | 2/1983 | Sewell et al. .......................... 410/154 |
| 4,386,881 | 6/1983 | Liebel ................................... 410/154 |
| 4,494,397 | 1/1985 | Rhoades . |
| 4,494,897 | 1/1985 | Rogers .................................. 410/154 |
| 4,865,889 | 9/1989 | Boyse ................................ 410/154 X |
| 5,306,100 | 4/1994 | Higginbotham .................... 410/122 X |
| 5,356,251 | 10/1994 | Sisco et al. ............................ 410/154 |
| 5,395,191 | 3/1995 | Kennan et al. ........................ 410/154 |
| 5,418,038 | 5/1995 | Wise et al. ........................ 428/12 X |
| 5,486,078 | 1/1996 | Wise et al. ............................ 410/155 |
| B1 4,494,897 | 3/1993 | Rogers .................................. 410/154 |

*Primary Examiner*—Stephen T. Gordon
*Attorney, Agent, or Firm*—Jefferson Perkins

[57] ABSTRACT

A void filler (10) has intersecting cellular or prismatic members (16, 34) that are disposed inside of an exterior housing (14). Sides (46, 44; 64, 66) of the prismatic members are disposed to be perpendicular to the substantially vertical sides (20, 22; 26, 28) of the outer housing (14), and are disposed at angles to each other. The sides (44, 46) are superimposed on sides (64, 66) in elevational section, so that they coact to provide resistance against compressive forces. Despite the increase in compressive strength thus provided, the void filler (10) occupies only four thicknesses of cardboard in a collapsed condition.

17 Claims, 7 Drawing Sheets

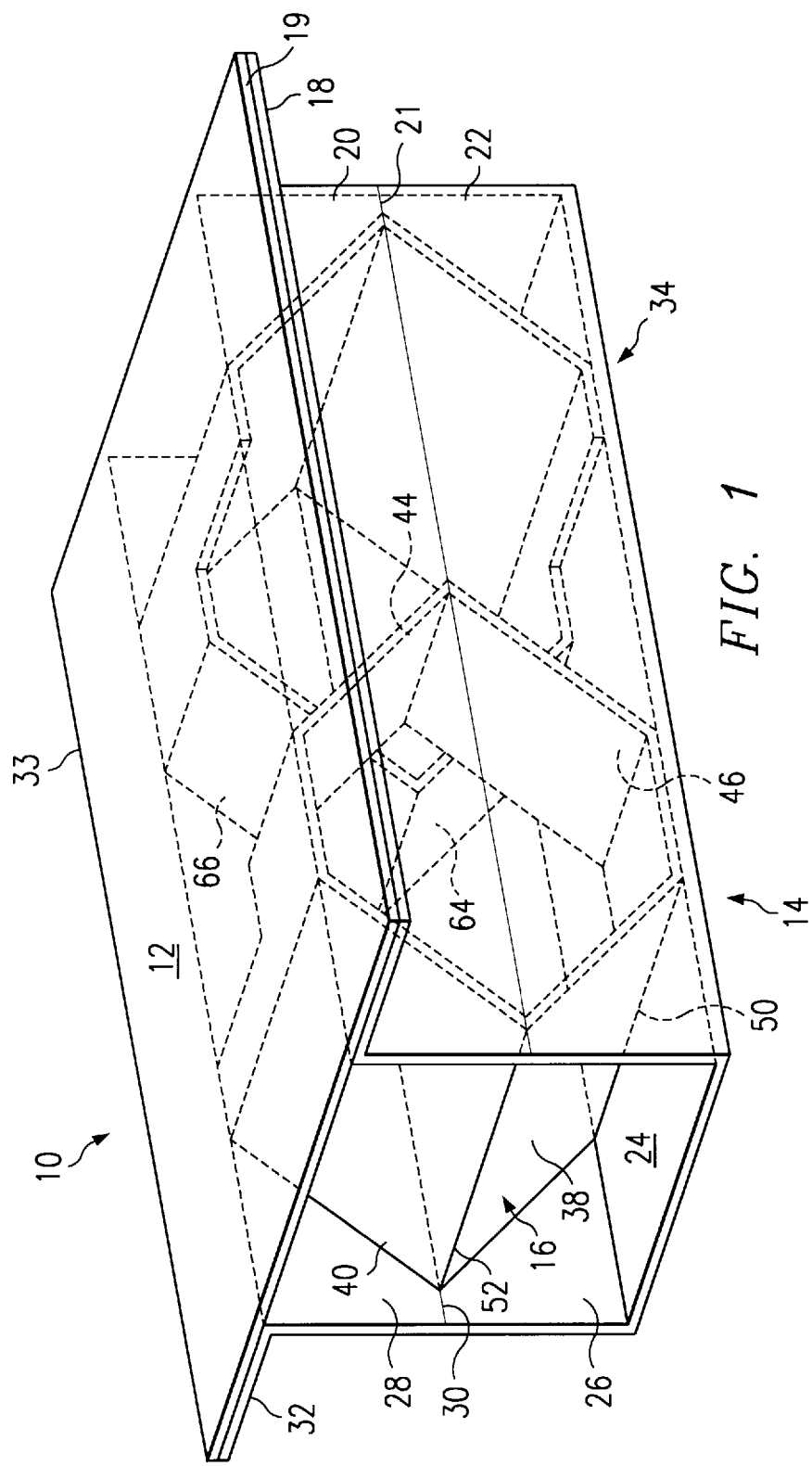

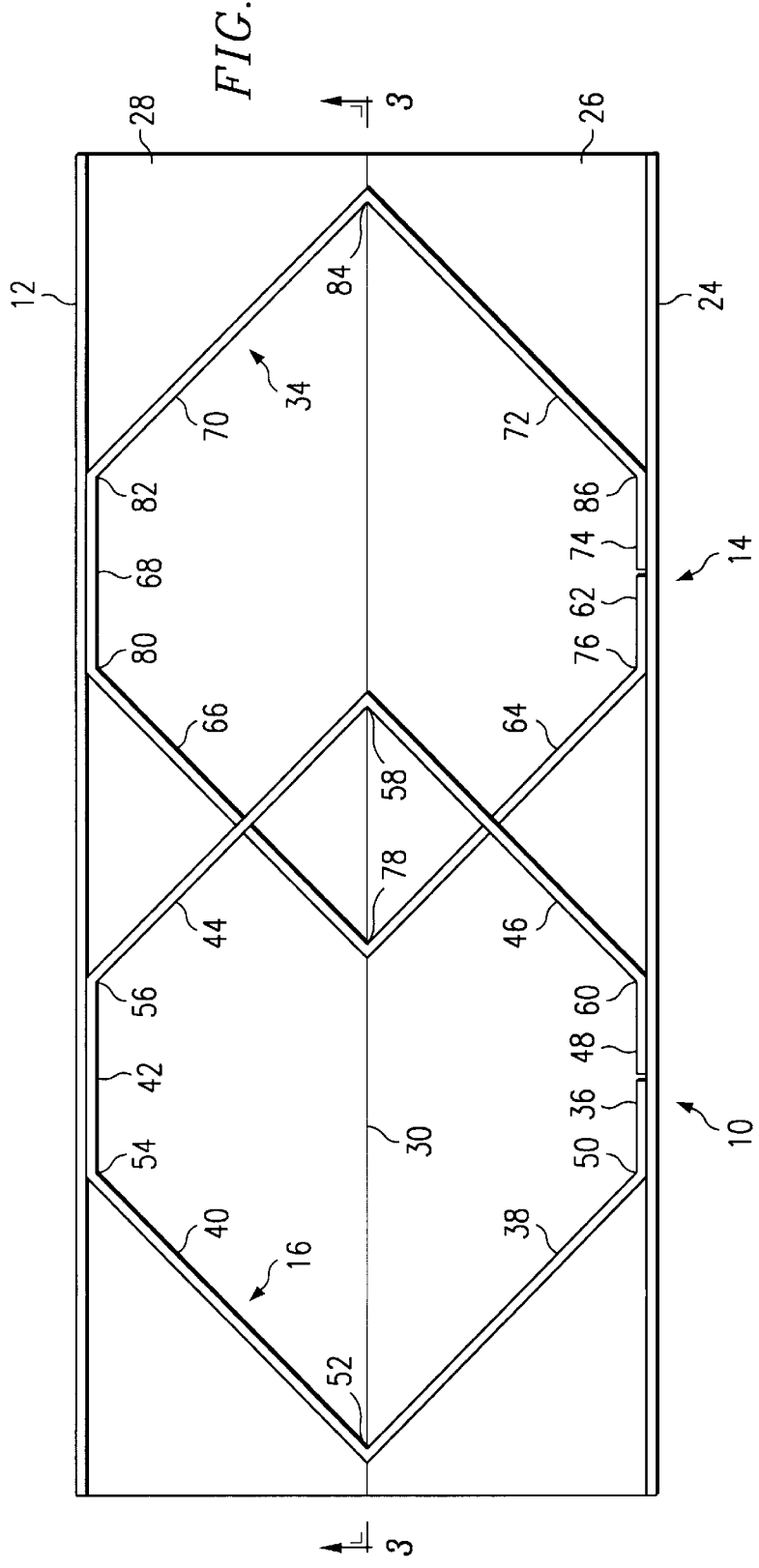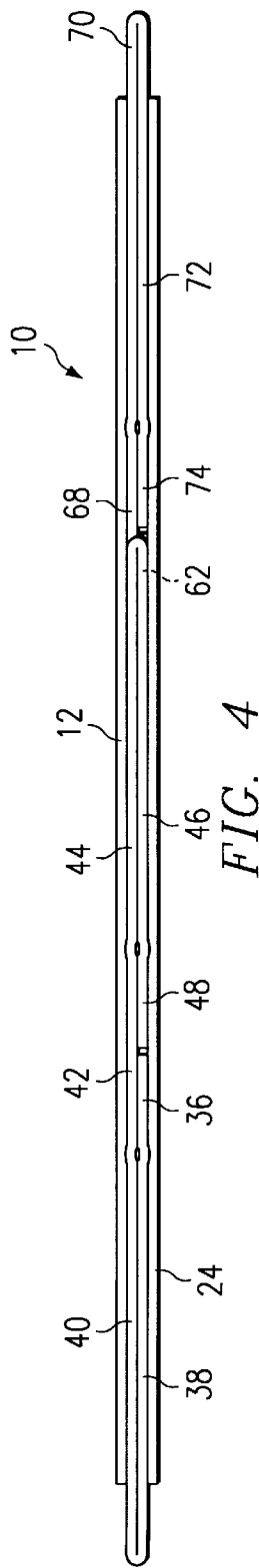

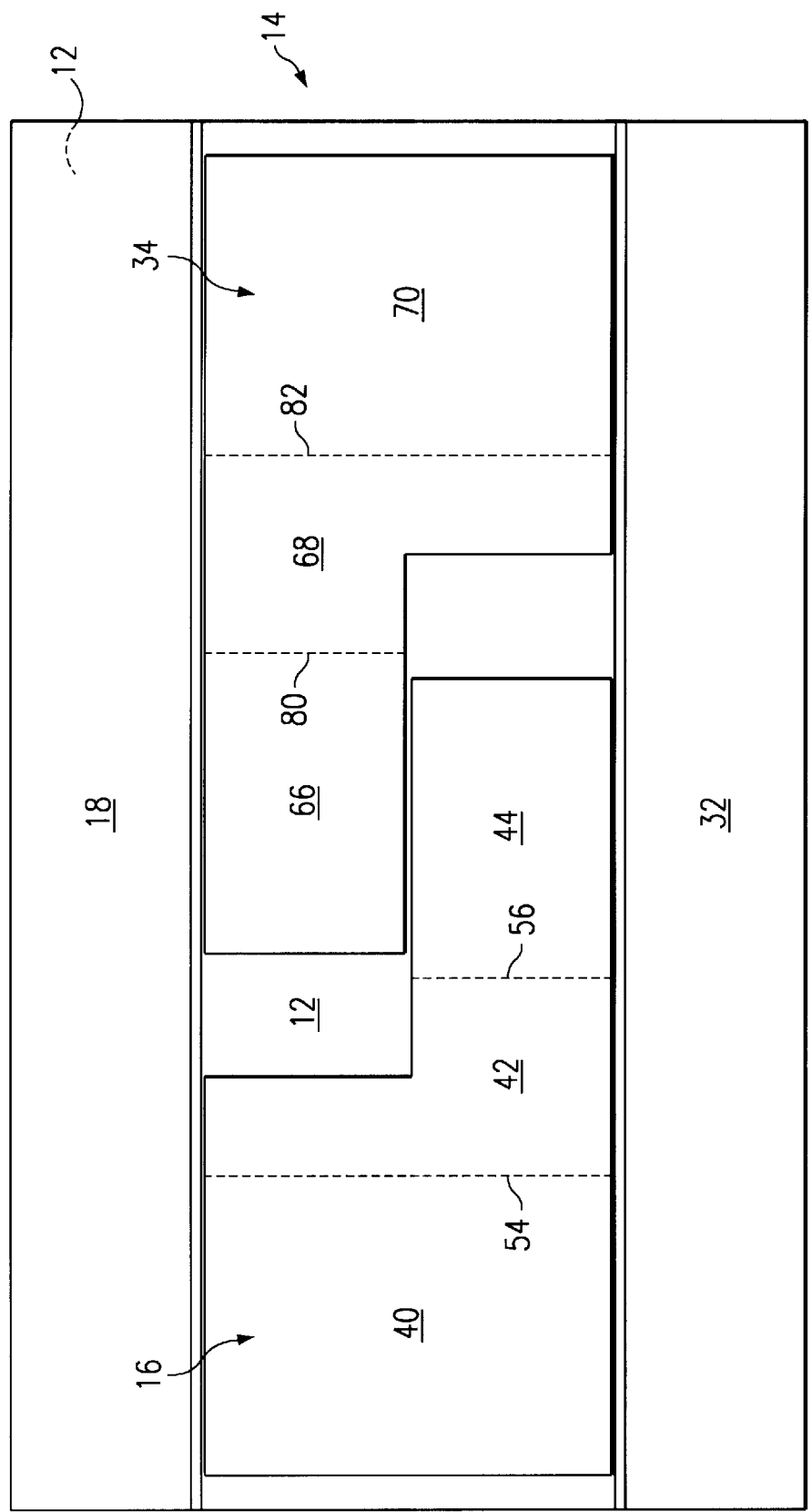

5,846,038

VOID FILLER WITH MULTIPLE INTERSECTING CELLS

TECHNICAL FIELD OF THE INVENTION

The present invention relates in general to shock absorption and movement prevention devices used to pack and immobilize items to be shipped, and more particularly relates to a one-piece void filler for placement in between cartons or the like, which void filler has an enhanced resistance to transverse compression and which may be folded up into a flat condition when not in use.

BACKGROUND OF THE INVENTION

Void fillers are known in the art for spacing apart cartons or the like when such cartons are loaded into semitrailers or onto rail cars for transit. One such void filler is shown in U.S. Pat. No. 4,494,897 issued to Rogers, the disclosure of which is fully incorporated herein by reference. The structure shown in that patent discloses a void filler having a single transverse core, indicated at 24 in FIG. 5 thereof. Applicants, however, believe that providing only a single such core against transverse compression forces is a less than optimum solution and therefore have invented an improved void filler which increases resistance to transverse compression by about 33%, but which has a cost of manufacture that is insignificantly higher than that structure and which takes close to the same space to store.

SUMMARY OF THE INVENTION

According to one aspect of the invention, a void filler is provided which fills a void between at least two items to be shipped, or between one item and the sidewall of a shipping container (including truck trailers and rail cars) so as to provide resistance against lateral movement of the item or items. The void filler includes a substantially rigid top panel or cap sheet having a length and a width sized to span a void between the two items to be shipped, such as palettes of goods. A left folding side panel has a top margin affixed to the bottom surface of the cap sheet interiorly of its left lateral margin, and a right folding side panel is similarly affixed to the cap sheet bottom surface interiorly of the right lateral margin thereof. A bottom panel joins the left side panel with the right side panel. The bottom and side panels form a housing.

A first prism-creating member forms upon unfolding the void filler, a first prism having an axis which is parallel to the top panel or cap sheet. A second prism-creating member is provided which, upon the opening or unfolding of the void filler, forms a second prism having an axis in parallel to the plane of the cap sheet, and preferably parallel to the axis of the first prism-creating member. Certain sides of the first prism are superimposed on sides of the second prism when the void filler is viewed in elevational section in a plane perpendicular to the axes of the prisms.

In this fashion, in the space of the prior single-core construction, the inventor has provided two cells, which in combination have a compressive strength that is approximately 150% of a similar prior art construction. Because the additional expense of this transverse compression cell is quite modest (about 4 cents per unit), the present invention provides a significant technical advantage at an insignificant additional cost and space for storing.

The invention may be provided in any of several cardboard weights or thicknesses depending on the application. Further, "single-drop", "double-drop" and "multiple-drop" embodiments may be provided as dictated by the height of the void to be filled.

According to another aspect of the invention, a void filler is provided which has an outer housing with opposed sides that are disposed to be substantially vertical and parallel to each other when the void filler is in an unfolded condition. At least one substantially flat transverse member, such as a top or a bottom, connects the sides together. A first reinforcing member and a second reinforcing member are disposed at least partially within the outer housing and each have a plurality of panels connected to each other. Each reinforcing member has at least a first panel that is joined to the flat transverse member. Each of the reinforcing members also has another, second panel which, when the void filler is in a collapsed condition, lies against the transverse member at a location different from the panel which is attached to the transverse member. The attached panels of the first and second reinforcing members, and the second panels of the first and second reinforcing members, occupy locations in a collapsed condition which are different from each other, such that all of these panels are substantially coplanar and occupy a single thickness. In a single-drop embodiment, the void filler of the invention occupies only four thicknesses of cardboard material in its collapsed condition, thereby creating an optimally minimal thickness of material and compactness when the void fillers are being shipped in an unused state or stored.

BRIEF DESCRIPTION OF THE DRAWINGS

Further aspects of the invention and their advantages will best be ascertained with reference to the following drawings, in which like characters identify like parts and in which:

FIG. 1 is an isometric schematic view of a first embodiment of the invention, certain internal panels being shown in phantom;

FIG. 2 is an elevational sectional view of the invention in its opened or folded-out condition, showing the intersection of two prism-creating members therein;

FIG. 3 is a sectional view taken substantially along line 3—3 of FIG. 2;

FIG. 4 is an elevational sectional view corresponding to FIG. 2, but showing the void filler of the invention in a collapsed condition;

DETAILED DESCRIPTION OF THE INVENTION

Figure 5:
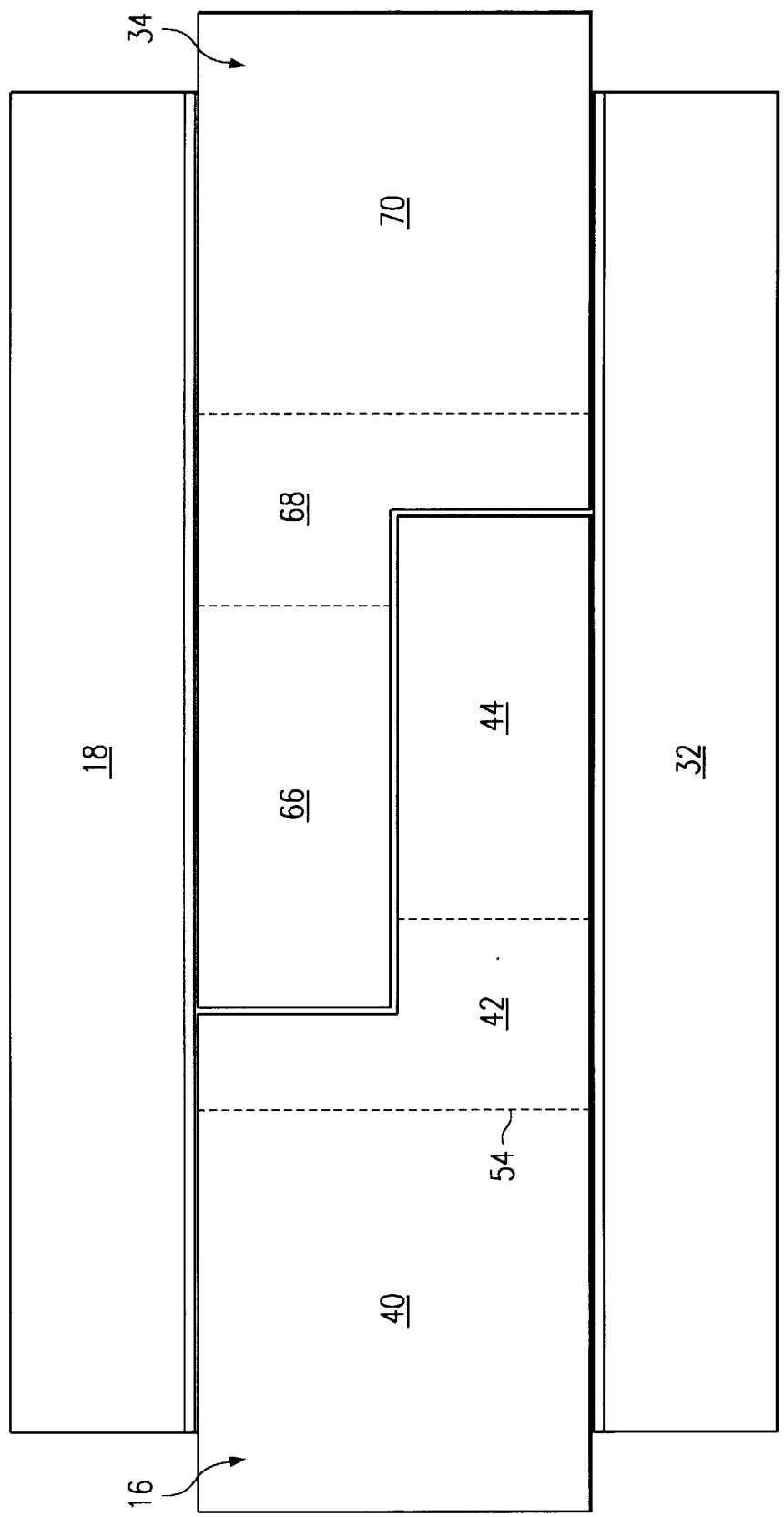
FIG. 5 is a plan sectional view corresponding to FIG. 3, but illustrating the invention in a collapsed condition.

Referring to FIG. 1, a void filler according to the invention is indicated generally at 10 in an unfolded condition. Void filler 10 is constructed of four single-sheet components: a flat, transverse cap sheet or top panel 12, a housing indicated generally at 14 which in the unfolded condition has spaced-apart, substantially vertical and parallel sides, and two interior reinforcing members, prisms or cells 34. All of the illustrated components are conveniently formed of a flat, rigid, strong and inexpensive material that may be easily cut and folded, such as corrugated cardboard. It is preferred that where called for, components 12–16 and 34 be affixed to each other by use of an adhesive, although other methods of affixation such as staples or rivets could also be used in the place of or in addition to adhesives, depending on the scale of the void filler to be manufactured and the stresses and treatment to which it is going to be subjected.

The cap sheet 12 is a single piece without scoring or fold lines. Housing 14 has fold lines or scores creating several panels. These include, in series, a right attachment panel 18 which is affixed to the underside of cap sheet 12 along a right margin 19 thereof; right folding sidewall panels 20 and 22, which are delimited from each other by a score or fold line 21; a bottom panel 24; left folding sidewall panels 26 and 28, again delimited by a score or fold line 30; and a left attachment panel 32 which is affixed to the underside of the cap sheet 12 along a left margin 33 thereof.

FIG. 2 is an elevational sectional view of the void filler 10, also in an opened or unfolded condition. This section is taken in a plane parallel to and in front of an axis of the housing 14. The two reinforcing cells 16 and 34 are each formed in the shape of a prism, and preferably take a hexagonal form as shown.

Prism 16 is formed of several panels 36–48. Starting from the bottom, panel 36 is affixed to the top surface of housing bottom panel 24. A score line 50 delimits panel 36 from a lower left diagonal panel 38, which in turn is delimited from an upper left diagonal panel 40 by a score line 52. Panel 40 is bounded by a score line 54, which connects panel 40 to a horizontal top panel 42 that is affixed to the underside of cap sheet 12. A score or fold line 56 delimits panel 42 from an upper right diagonal panel 44, in turn is delimited by a score line 58 from a lower right diagonal panel 46. Panel 46 proceeds downwardly until its termination at a score line 60, which delimits panel 46 from a bottom horizontal panel 48. Panel 48 is affixed to the top surface of the bottom panel 24. Panels 36 and 48 may be affixed to the upper surface of bottom panel 24 in abutting relationship. Panels 38, 40, 44 and 46 are free-floating, are preferably of substantially the same length, and have no connection to anything except through top and bottom attachment panels 36, 42 and 48 in the manner shown. Panels 36, 38 and 40 and a portion of panel 42 extend for most of the interior width (measured in a direction perpendicular to the paper in FIG. 2) of the void filler between folding sidewall panels 20 and 22 on the one side and folding sidewall panels 26 and 28 on the other, as is shown in FIG. 1. Sides 44 and 46, however, extend only a fraction of this width, and in a preferred embodiment occupy the front half of the housing 14 as it appears in FIG. 1.

The other transverse cell or prism 34 is formed of panels 62–74, which in an unfolded condition are disposed as follows. A horizontal bottom panel 62 is affixed to the upper surface of bottom panel 24 of housing 14. Panel 64 is delimited from panel 62 by a score line 76 and, in the unfolded condition of the apparatus, extends to the left and upwardly to the center of the device, where it terminates in a score or fold line 78. From there a panel 66 proceeds upwardly and to the right until it is terminated by a score or fold line 80. Score line 80 connects panel 66 to top panel 68, which is affixed to the underside of cap sheet 12. A score line 82 connects fixed panel 68 with an upper right floating panel 70, which proceeds downwardly and to the right, preferably to the center line of the device 10, and terminates in a score line 84. The score line 84 delimits panel 70 from a mirror-image panel 72, which proceeds downwardly to a score line 86. Score line 86 in turn connects the panel 72 to a fixed panel 74, which is affixed to the upper side of bottom panel 24 of housing 14. Panels 70, 72 and 74, and a portion of panel 68, occupy substantially the entire width of housing 14 in a direction perpendicular to the paper as shown in FIG. 2. Panels 64 and 66, however, occupy only a fraction, such as the rear half, of the housing 14, and slide behind panels 44 and 46 of cell 16 as the void filler 10 is opened. Panels 44 and 46 coact with panels 64 and 66 to occupy substantially the entire width of housing 14 and thereby are adaptable to resist a compressive force acting in the direction which is perpendicular to the paper in FIG. 2 when they are in their folded-out or opened condition.

While in the illustrated embodiment panels 38, 40, 44, 46, 64, 66, 70 and 72 are all of substantially equal length, the length of these panels may be varied, as long as the variance is done in pairs. Thus, panels 70 and 72 may be made longer than panels 64 and 66, as long as panels 64 and 66 are equal in length and panels 70 and 72 are equal in length. Pairs of panels may be lengthened or shortened to accommodate different lengths of the void filler 10, so as to provide resistance to compressive forces everywhere along the length of the void filler 10.

FIG. 3 is a sectional view taken substantially along line 3—3 of FIG. 2, and looks upward toward the underside of the cap sheet 12. Visible are three panels apiece of the two prismatic cells 16 and 34: panels 40, 42 and 44 on the one hand, and panels 66, 68 and 70 on the other. FIG. 3 illustrates these panels in an extended or unfolded condition. As can be seen, panel 44 occupies only the front half of the housing 14, and panel 42 is cut out in an "L" shape such that only a portion of it extends all the way across the housing 14. Panels 66 and 68 are formed in complementary mirror image fashion with respect to panels 42 and 44. In the extended or unfolded condition, the lengthwise extent of panels 40 and 70 is preferably approximately the same as the length of the bottom panel 24.

FIGS. 4 and 5 illustrate the void filler 10 in a collapsed condition, as it is disposed for transportation in an unused state and for storage. As can be seen in FIG. 4, despite the presence of an additional reinforcing cell, the void filler 10 only occupies four thicknesses of cardboard, and thus takes no additional space in the vertical direction. The additional space taken in the lengthwise condition is minimal. This is made possible by the careful selection of the widths and lengths of the intersecting sides or panels, as is best shown in FIG. 5.

FIG. 5 corresponds to the view shown in FIG. 3, but illustrates the void filler 10 in a collapsed condition, once again looking upwardly. Note that panels 42 and 68 have been cut out so as to receive panels 66 and 44, respectively, without any overlap. This allows panels 40, 42, 44, 66, 68 and 70 to occupy separate locations adjacent cap sheet 12, to be substantially coplanar in a collapsed condition and to occupy a single thickness of space. In a collapsed condition, lower prism panels 38, 36, 48, 46, 64, 62, 74 and 72 are in relationships with each other that are congruent to the relationships of the upper prism panels described immediately above.

Housing 14, in conjunction with cap sheet 12, forms a prism or tube having an axis in parallel with the length of the void filler 10. As the void filler 10 is collapsed to a condition for storing, side panels 20 and 22 will fold about score line 21 and will bow outwardly in relation to this axis. In mirror image fashion, folding side panels 28 and 26 will bow outwardly around score line 30. In a collapsed condition, housing panels 22, 24 and 26 will lie in the same plane, with panels 20 and 28 immediately on top of panels 22 and 26, respectively.

Figure 6:
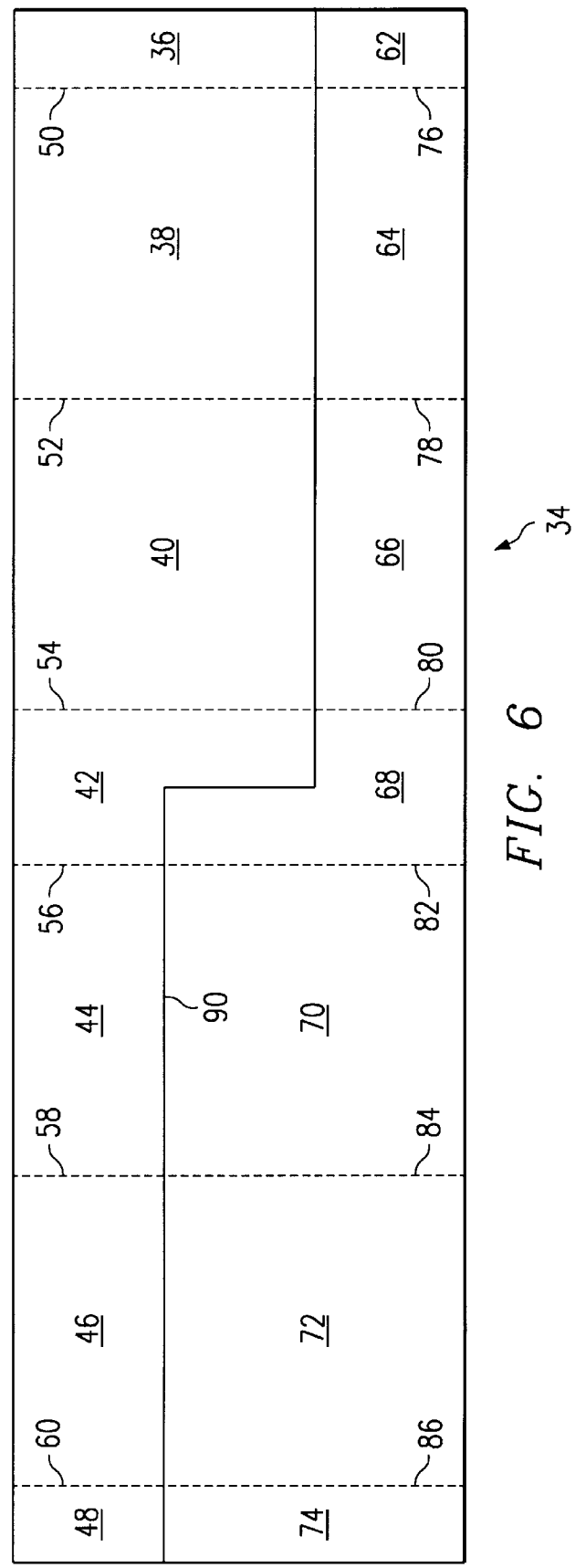
FIG. 6 is a plan view of a blank used to form the two prism-creating members according to the invention.

FIG. 6 illustrates how prisms or cells 16 and 34 may advantageously be formed out of a single rectangular blank. Folding or score lines 60, 86; 58, 84; 56, 82; 54, 80; 52, 78; and 50, 76 may be formed by six bead rolling operations, after which time the blank may be cut apart into two separate halves along line 90. FIG. 6 illustrates how prismatic cells 16 and 34 may be fabricated with a minimum of manufacturing steps and no waste in cardboard material.

Figure 7:
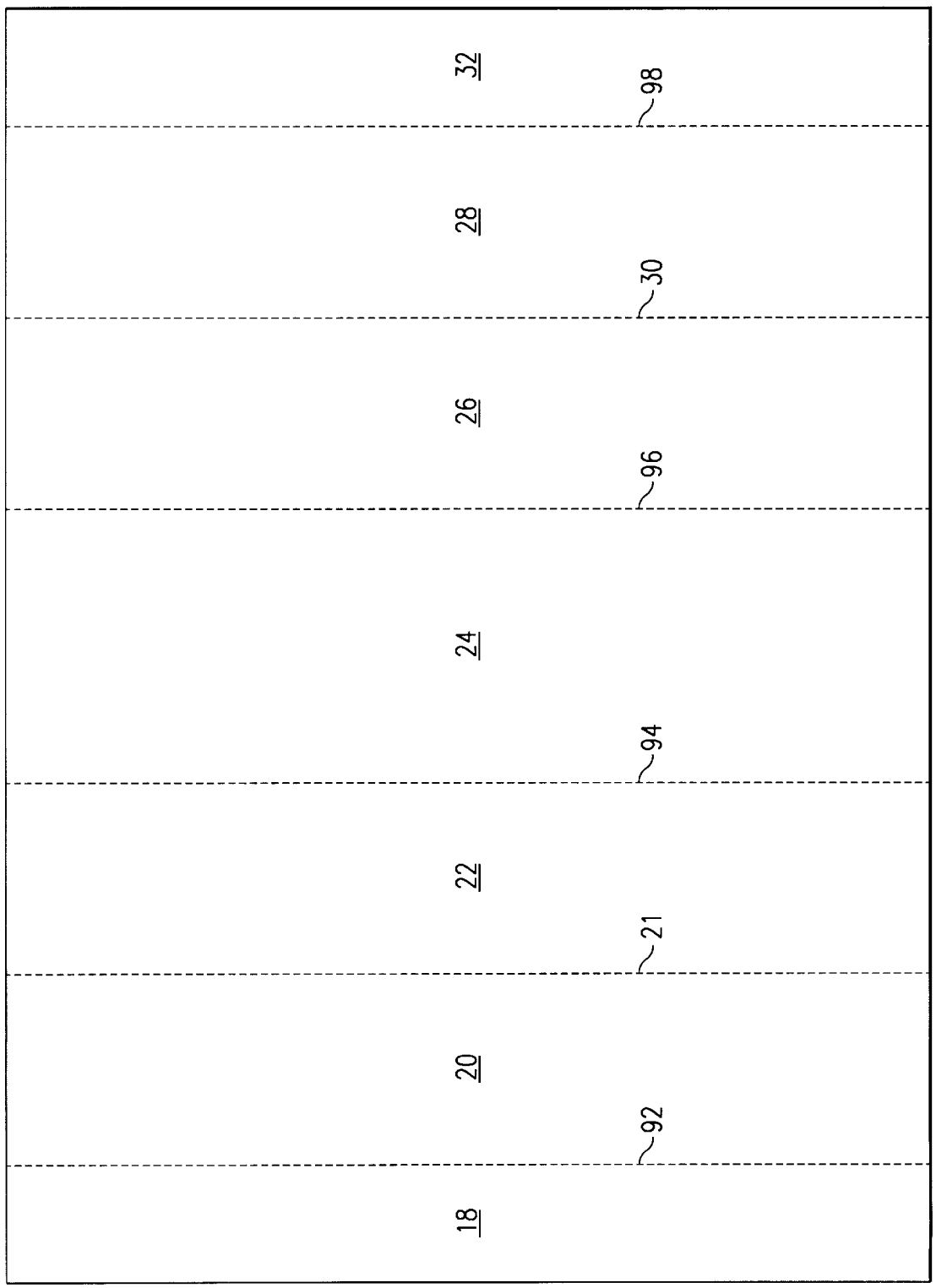
FIG. 7 is a plan view of a blank used to make the outer housing of the invention.

FIG. 7 illustrates a blank used to form housing 14. Score or fold lines 92, 21, 94, 96, 30, and 98 respectively delimit from each other panels 18, 20; 20, 22; 22, 24; 24, 26; 26, 28; and 28, 32. Score line 92 serves as the top margin of a sidewall formed by folding side panels 20 and 22, while score line 98 similarly forms a top margin of a side wall formed by folding panels 26 and 28. Score lines 94 and 96 form the bottom corners of the housing 14.

In a preferred embodiment, the blank forming prismatic cells 16 and 34 may be 57" by 17⅝", the blank forming housing 14 may be 54" by 36", and the blank forming cap sheet 12 may be 36" by 22". The assembled and unfolded void filler 10 may be chosen to be 36" in length, 12" in width (excluding outwardly extending portions of cap sheet 12) and 16" in depth. These dimensions may be altered according to the application. Conveniently, all components may be made from 200 PSI test C-flute corrugated cardboard sheets; the cardboard used may also be 380 PSI test E-flute cardboard, or other varieties.

Figure 8:
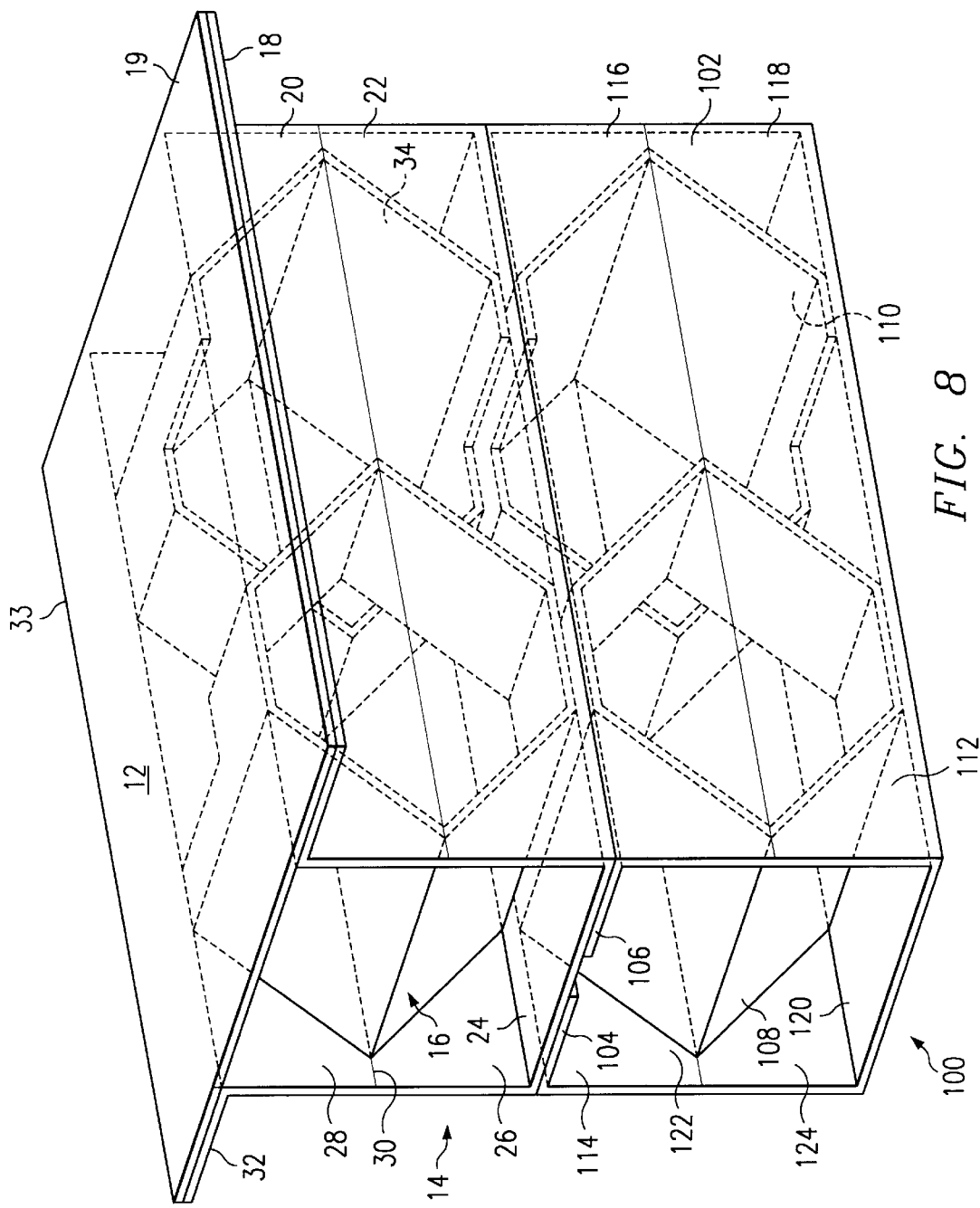
FIG. 8 is an isometric view of a second, double-drop embodiment of the invention, certain internal panels being shown in phantom.

FIG. 8 is an isometric view of a "double drop" embodiment 100 of the invention, in which a second housing 102 depends from the first housing 14. Second or lower housing 102 is similar in all respects to housing 14, with the exception that its top attachment panels 104 and 106 are affixed to the underside of bottom panel 24 of the top housing 14. Bottom housing 102 contains two transverse prismatic cells 108 and 110. The details of construction of these cells are similar to those already described for cells 16 and 34. As including prism-creating members 108 and 110, second housing 102 may conveniently be constructed using the same components as housing 14 and prismatic members 16 and 34. However, instead of being folded outward to be attached to a cap sheet, the attachment panels 104 and 106 are folded inwardly for affixation to the bottom of transverse member 24 of the top housing 14, as shown.

As thus constructed, each opposed, substantially vertical side 112 and 114 will each be composed of first, second, third and fourth side panels. The first and second side panels of side 112 are indicated at 20 and 22, and extend between the cap sheet 12 and what has become the middle or second transverse member 24. Third and fourth side panels 116 and 118 extend between the second transverse member 24 and a bottom or third transverse member 120. Similarly, for opposed side 114, the top side panels are formed by panels 26 and 28, while the third and fourth side panels of the side 114 are formed by joined panels 122 and 124, respectively. In a collapsed condition, panels 20 and 22; 116, 118; 122, 124; and 26, 28 will fold up upon each other in pairs, accordion-fashion.

In further embodiments (not shown), triple-, quadruple-, and other multiple-drop void fillers can be constructed, simply by adding on further housing/prism member units or combinations, each of which would be identical to housing 102 and prism members 108 and 110. Using this construction technique, any of a variety of void depths can be accommodated. The "multiple drop" embodiments are meant for use in situations where a void having a large depth needs to be filled. Alternatively, multiple "single drop" components, all except the top component with a cap sheet not having outwardly extending flanges (not shown), could be used instead.

In summary, a novel void filler has been shown and described, employing two intersecting prisms or cells, which will show a 33% increase in resistance to compressive force in a direction parallel to the cellular axes, which will occupy no additional thickness in a collapsed condition and little additional length, and which will take very little extra in terms of cost or manufacturing operation to produce.

The present invention is not limited to the embodiments described in the above detailed description and illustrated in the drawings, but only by the scope and spirit of the appended claims.

What is claimed is:

1. A void filler for filling a void between at least two items to be shipped, or between one such item and a wall of a shipping container, so as to provide resistance against lateral movement, said void filler unfoldable from a collapsed condition to an unfolded condition and comprising:

a substantially rigid top panel having a length and a width sized to span a void between the two items, left and right lateral margins separated by said width, and a bottom surface;

a left folding side panel having a top margin affixed to said bottom surface interiorly of said left lateral margin, said left folding side panel having a bottom margin;

a right folding side panel having a top margin affixed to said bottom surface interiorly of said right lateral margin, said right folding side panel having a bottom margin;

a bottom panel joining said bottom margin of said left side panel with said bottom margin of said right side panel;

a first prism-creating member forming a first prism having an axis parallel to said top panel, said prism-creating member having opposed ends both of which are affixed to said bottom surface of said top panel interiorly of said top margins of said left and right side panels; and a second prism-creating member forming a second prism having an axis parallel to said top panel, opposed ends of said second prism-creating member being affixed to said bottom surface of said top panel interiorly of said top margins of said left and right side panels, said prism-creating members forming sides of said first and second prisms, sides of said first prism superimposed on sides of said second prism when said void filler is in said unfolded condition and viewed in elevational section in a plane perpendicular to said axes of said prisms.

2. A void filler for filling a void between at least two items to be shipped, or between one such item and a wall of a shipping container, so as to provide resistance against lateral movement, comprising:

an outer housing having opposed, substantially vertical sides disposed substantially in parallel to each other, said sides being spaced from each other by a width;

a first reinforcing member disposed between said vertical sides, said first reinforcing member having a plurality of panels joined together, adjacent ones of said panels disposed at angles to each other and substantially perpendicular to said vertical sides; and a second reinforcing member disposed between said vertical sides, said second reinforcing member having a plurality of panels joined together, adjacent ones of said panels of said second reinforcing member disposed at angles to each other and substantially perpendicular to said vertical sides, a first plurality of said panels of said first member having a width taken in a direction perpendicular to said substantially vertical sides which is a first fraction of the width between said vertical sides, a second plurality of said panels of said second member having a width taken in a direction perpendicular to said substantially vertical sides which is a second fraction of the width of said vertical sides, the sum of said first and second fractions being less than or equal to said width between said vertical sides, said first and second reinforcing members plurality of panels, when viewed from a direction perpendicular to said vertical sides, being superimposed on each other and coacting to provide resistance to compressive force acting from a direction perpendicular to said vertical sides.

3. The void filler of claim 2, wherein said first fraction and said fraction are each approximately one-half of said width between said substantially vertical sides.

4. The void filler of claim 2, wherein said void filler is unfoldable from a collapsed condition to an unfolded condition.

5. The void filler of claim 4, wherein said substantially vertical sides each comprises folding sidewall panels which are substantially coplanar when said void filler is in an unfolded condition, said folding sidewall panels folding on each other when said void filler is in a collapsed condition.

6. The void filler of claim 4, wherein said reinforcing members each include panels which extend out of said housing when said void filler is in a collapsed condition.

7. A void filler for filling a void between at least two items to be shipped, or between one item and the wall of a shipping container, so as to provide resistance against lateral movement, said void filler unfoldable from a collapsed condition to an unfolded condition and comprising:

an outer housing having opposed sides disposed to be substantially vertical and parallel to each other when said void filler is in the unfolded condition, at least one substantially flat transverse member connecting said sides of said housing together;

a first hexagonal reinforcing member disposed between said sides when said void filler is in said unfolded condition and including a first plurality of panels which are joined together, ones of said first plurality of panels being disposed at angles to each other and substantially perpendicular to said sides when said void filler is in said unfolded condition, at least a first of said first plurality of panels being joined to said transverse member at a first location;

a second hexagonal reinforcing member disposed between said sides when said void filler is in said unfolded condition and including a second plurality of panels which are joined together, ones of said second plurality of panels being disposed at angles to each other and substantially perpendicular to said sides when said void filler is in said unfolded condition, at least a first of said second plurality of panels being joined to said transverse member at a second location different from said first location; and at least a second panel of said first plurality of panels lying against said transverse member at a third location different from said first and second locations when said void filler is in said collapsed condition, at least a second panel of said second plurality of panels lying against said transverse member at a fourth location different from said first, second and third locations, such that said first and second panels of said first hexagonal reinforcing member and said first and second panels of said second hexagonal reinforcing member are substantially coplanar when said void filler is in said collapsed condition.

8. The void filler of claim 7, wherein each of said reinforcing members is formed of a single sheet having said plurality of panels, two of said panels of said single sheet affixed to said transverse member.

9. The void filler of claim 7, wherein said transverse member is either a top or a bottom.

10. The void filler of claim 7, wherein said at least one transverse member of said void filler comprises two transverse members, one of said transverse members being a top panel connecting said sides of said housing together and the other of said transverse members being a bottom panel spaced from said top panel connecting said sides of said housing together.

11. A void filler for filling a void between at least two items to be shipped, or between one item and the wall of a shipping container, so as to provide resistance against lateral movement, said void filler unfoldable from a collapsed condition to an unfolded condition and comprising:

an outer housing having opposed sides disposed to be substantially vertical and parallel to each other when said void filler is in the unfolded condition, at least one substantially flat transverse member connecting said sides of said housing together;

a first reinforcing member disposed between said sides when said void filler is in said unfolded condition and including a first plurality of panels which are joined together, ones of said first plurality of panels being disposed at angles to each other and substantially perpendicular to said sides when said void filler is in said unfolded condition, at least a first panel of said first plurality of panels being joined to said transverse member at a first location;

a second reinforcing member disposed between said sides when said void filler is in said unfolded condition and including a second plurality of panels which are joined together, ones of said second plurality of panels being disposed at angles to each other and substantially perpendicular to said sides when said void filler is in said unfolded condition, at least a first panel of said second plurality of panels being joined to said transverse member at a second location different from said first location; and at least a second panel of said first plurality of panels lying against said transverse member at a third location different from said first and second locations when said void filler is in said collapsed condition, at least a second panel of said second plurality of panels lying against said transverse member at a fourth location different from said first, second and third locations, such that said first and second panels of said first reinforcing member and said first and second panels of said second reinforcing member are substantially coplanar when said void filler is in said collapsed condition, wherein said first and second reinforcing members each further include a third panel, said third panels lying against said transverse member in fifth and sixth locations, respectively, when said void filler is in the collapsed condition, said fifth and sixth locations being different from each other and from said first, second, third and fourth locations.

12. A void filler for filling a void between at least two items to be shipped, or between one item and the wall of a shipping container, so as to provide resistance against lateral movement, said void filler unfoldable from a collapsed condition to an unfolded condition and comprising:

an outer housing having opposed sides disposed to be substantially vertical and parallel to each other when said void filler is in the unfolded condition, at least one substantially flat transverse member connecting said sides of said housing together;

a first reinforcing member disposed between said sides when said void filler is in said unfolded condition and including a first plurality of panels which are joined together, ones of said first plurality of panels being disposed at angles to each other and substantially perpendicular to said sides when said void filler is in said unfolded condition, at least a first panel of said first plurality of panels being joined to said transverse member at a first location;

a second reinforcing member disposed between said sides when said void filler is in said unfolded condition and including a second plurality of panels which are joined together, ones of said second plurality of panels being disposed at angles to each other and substantially perpendicular to said sides when said void filler is in said unfolded condition, at least a first panel of said second plurality of panels being joined to said transverse member at a second location different from said first location; and at least a second panel of said first plurality of panels lying against said transverse member at a third location different from said first and second locations when said void filler is in said collapsed condition, at least a second panel of said second plurality of panels lying against said transverse member at a fourth location different from said first, second and third locations, such that said first and second panels of said first reinforcing member and said first and second panels of said second reinforcing member are substantially coplanar when said void filler is in said collapsed condition said transverse member having a top, a bottom spaced from said top connecting said sides of said housing together;

a third panel of said first reinforcing member joined to said bottom at a first bottom location, a fourth panel of said first reinforcing member lying against said bottom at a second bottom location different from said first bottom location when said void filler is in the collapsed condition; and a third panel of said second reinforcing member joined to said bottom at a third bottom location different from said first and second bottom locations, a fourth panel of said second reinforcing member lying against said bottom at a fourth bottom location different from said first, second and third bottom locations when said void filler is in the collapsed condition, such that said third and fourth panels of said first and second reinforcing members are substantially coplanar when said void filler is in the collapsed condition.

13. The void filler of claim 12, wherein each of said reinforcing members is formed of a single sheet having said plurality of panels, two of said panels of said sheet affixed to a preselected one of said top and said bottom, one panel of said sheet affixed to the other of said top and said bottom.

14. A void filler for filling a void between at least two items to be shipped, or between one item and the wall of a shipping container, so as to provide resistance against lateral movement, said void filler unfoldable from a collapsed condition to an unfolded condition and comprising:

an outer housing having opposed sides disposed to be substantially vertical and parallel to each other when said void filler is in the unfolded condition, at least one substantially flat transverse member connecting said sides of said housing together;

a first reinforcing member disposed between said sides when said void filler is in said unfolded condition and including a first plurality of panels which are joined together, ones of said first plurality of panels being disposed at angles to each other and substantially perpendicular to said sides when said void filler is in said unfolded condition, at least a first panel of said first plurality of panels being joined to said transverse member at a first location;

a second reinforcing member disposed between said sides when said void filler is in said unfolded condition and including a second plurality of panels which are joined together, ones of said second plurality of panels being disposed at angles to each other and substantially perpendicular to said sides when said void filler is in said unfolded condition, at least a first panel of said second plurality of panels being joined to said transverse member at a second location different from said first location; and at least a second panel of said first plurality of panels lying against said transverse member at a third location different from said first and second locations when said void filler is in said collapsed condition, at least a second panel of said second plurality of panels lying against said transverse member at a fourth location different from said first, second and third locations, such that said first and second panels of said first reinforcing member and said first and second panels of said second reinforcing member are substantially coplanar when said void filler is in said collapsed condition, wherein said reinforcing members each form prisms when said void filler is in the unfolded condition.

15. The void filler of claim 14, wherein said reinforcing members each form prisms having six sides.

16. A void filler for filling a void between at least two items to be shipped, or between one such item and a wall of a shipping container, so as to provide resistance against lateral movement, said void filler unfoldable from a collapsed condition to an unfolded condition and comprising:

and outer housing having opposed sides disposed to be substantially vertical and parallel to each other when said void filler is in the unfolded condition, a substantially flat top transverse member, a substantially flat second transverse member and a substantially flat third transverse member each connecting said sides of said housing together and being spaced from each other, said transverse members being substantially parallel to each other;

each of said sides being a folding sidewall having first, second, third and fourth side panels which are substantially coplanar when said void filler is in the unfolded condition, said first side panel folding on said second side panel and said third side panel folding on said fourth side panel when said void filler is in the collapsed condition, said first and second side panels disposed between said top and said second transverse members, said third and fourth side panels disposed between said second and third transverse members; and at least a first prism-creating member joined between said top transverse member and said second transverse member, at least a second prism-creating member joined between said second transverse member and said third transverse member, said prism-creating members having axes substantially perpendicular to said sides when said void filler is in the unfolded condition, portions of said prism-creating members extending completely between said sides when said void filler is in the unfolded condition.

17. The void filler of claim 16, wherein said top transverse member is formed by a cap sheet;

a first housing member forming said first and second side panels of each of said opposed sides, a bottom of said first housing member forming said second transverse member; and a second housing member forming said third and fourth side panels of each of said opposed sides, a bottom of said second housing member forming said third transverse member.

\* \* \* \* \*